United States Patent [19]
Barrett

[11] 4,445,188
[45] Apr. 24, 1984

[54] MEDIA DISTRIBUTION OF HEAD CONTACT WEAR ON A DISC

[75] Inventor: Peter M. Barrett, Blairgowrie, Scotland

[73] Assignee: Burroughs Corporation, Detroit, Mich.

[21] Appl. No.: 253,763

[22] PCT Filed: Jul. 11, 1980

[86] PCT No.: PCT/GB80/00118
§ 371 Date: Mar. 26, 1981
§ 102(e) Date: Mar. 26, 1981

[87] PCT Pub. No.: WO81/00479
PCT Pub. Date: Feb. 19, 1981

[30] Foreign Application Priority Data
Aug. 2, 1979 [GB] United Kingdom ............... 7926894

[51] Int. Cl.³ .................... G11B 21/02; G11B 5/55
[52] U.S. Cl. ............................ 364/550; 360/75; 360/106
[58] Field of Search .................... 364/550–552; 360/77, 78, 75, 97–99, 109, 105, 106, 118

[56] References Cited
U.S. PATENT DOCUMENTS

| | | | |
|---|---|---|---|
| 3,609,721 | 9/1971 | Meneley | 360/97 |
| 3,632,900 | 1/1972 | Kurzweil, Jr. | 360/109 |
| 3,860,958 | 1/1975 | Hanson | 360/118 |
| 4,146,911 | 3/1979 | Gyi et al. | 360/109 |
| 4,237,501 | 12/1980 | Barmache et al. | 360/105 |

OTHER PUBLICATIONS

"Integrated Burnish and Glide Head Instrumentation for Disk Process", published in IBM Tech. Disclosure Bulletin, vol. 21, No. 9, Feb. 1979, pp. 3761–3762.
"Multiple Band Loading Zone for Direct-Access Storage Devices", published in IBM Tech. Disclosure Bulletin, vol. 21, No. 11, Apr. 1979, p. 4648.
"Breakthrough in Random Access Technology" by Fardell, Published in Electronics Weekly, No. 637, Nov. 12, 1972.

*Primary Examiner*—Gary Chin
*Attorney, Agent, or Firm*—David G. Rasmussen; Kevin R. Peterson; Edmund M. Chung

[57] ABSTRACT

A disc file, for the storage of retrievable, informational data, on rotating media, where the media is subject to attrition from the mechanical interaction with its surface of an adjacently disposed, radially mobile transducer, the attrition limiting the operational life expectancy of the media by its ultimate effect of destroying, in whole or in part, the data storage properties of its surface, is provided with an apparatus which, by enforcing the unceasing transport of the transducer across the surface of the media, whenever it is not required, by the disc file, that the transducer be adjacently disposed to any specific radius, on the media, disperses the effects of attrition across the entire surface of the media, so eliminating the early destruction of the media resultant from localization of the attrition, thereby extending the working life expectancy of the media.

22 Claims, 11 Drawing Figures

MEDIA DISTRIBUTION OF HEAD CONTACT WEAR ON A DISC

The present invention relates to a method and apparatus whereby the attritional wear, encountered between the reading and writing transducer and the rotating media of certain styles of disc files, is distributed accross the entire data storage surface of the media, thereby eliminating the local nature of the attritional wear, and extending the working life expectancy of the media.

In particular, the present invention relates to an apparatus for the storage of retrievable, informational data on rotating media, where the media is subject to attritional wear as a result of the mechanical interaction between the surface of the media and a radially mobile transducer, wherein there is provided an apparatus, keeping the transducer radially mobile accross the surface of the rotating media at all times that the transducer is not required, by the normal operation of the disc file, to stay still, the apparatus so distributing the attritional wear accross the entire media data storage surface, and thereby preventing the early end of life of the media resultant from localised attrition destroying the data storage properties of the media in one location before significant wear has occurred at others.

More particularly, the present invention relates to a disc file for use with flexible, magnetic discs, retrievable, informational data being stored in a plurality of concentric, data storage tracks on the rotating disc, wherein the disc is accessed by the contacting of a radially mobile reading and writing head with the disc surface, there being provided an apparatus whereby the head is kept constantly mobile accross the disc surface at all times that the head is not required, by the normal operations of the disc file, to stay still, so eliminating local attrition of the disc magnetic coating by the head remaining too long at any particular radius on the disc, and eliminating too long at any particular radius on the disc, and eliminating the subsequent loss of individual data tracks before other data tracks have encountered significant wear.

THE PRIOR ART

In the early style of disc files, a magnetic, data storage, disc file universally employed rigid, rotating media, over which a reading/writing magnetic head was flown, at a height of a few hundreds of microinches, on a film of air, which was dragged round by the rapidly rotating, smooth disc. The smoothness of the disc was such that the bumps on the disc never exceeded the flying height of the head, and so the head never touched the disc surface. There was thus little or no frictional wear between the head and the disc, since the only time that contact existed between the two was during a failure condition, when the head was not flying or the disc not rotating.

The introduction of the low cost, easily stored, and small sized, flexible disc, brought with it various head and disc problems. Firstly, the disc was mechanically small, weak, and could not readily be caused to rotate at the high angular speeds necessary for the head to fly on a film of air, dragged round by the disc. Secondly, the smooth disc surfaces possible on the earlier rigid discs, which were fabricated from plated metal, were not possible to achieve in the manufacture of flexible discs, fabricated from buffed and cut polymer sheet. What flying height could be achieved by the heads, was not sufficient to allow the head to clear the bumps or the flexure distortions on the flexible disc. Thirdly, the continuing trend toward higher data densities on all styles of disc necessitated, for considerations given later, that the distance between the head and the surface of the disc be made extremely small indeed.

The flexible disc, popularly known as the "floppy" disc, consists of a circular lamina, cut from a polymer sheet, such as mylar, a few thousandths of an inch thick, and coated on one or both surfaces with a uniform layer, generally less than a hundred microinches thick, of magnetic material, usually composed of finely divided oxides of iron, held together by a passive, binder substance.

In use, the disc is caused to rotate about its centre, a magnetic record/replay head being placed adjacently to the disc surface, at a know radius form the disc centre, so as to record or read back data, from plurality of concentric, data storage tracks, the data recorded or recovered being in the form of encoded, magnetic flux transition patterns emprinted on the magnetic layer of the disc by the laying down of a sequential plurality of adjacent, oppositely magnetised areas around the track.

The head and the magnetic field of the disc interact together to generate a readback signal representative of what is laid down on the disc. The performance of the combination of the disc and the magnetic head, on replay, may be characterised by the properties of amplitude and resolution. The amplitude of the recovered signal relates to the size of the signals that the head generates from the magnetic flux transitions, present at the disc's surface. The resolution of the combination relates to their ability to distinguish between adjacent flux transitions on the disc surface. Poor resolution results in "inter symbol interference" where the signal generated from one flux transition, merges with the signal generated from adjacent flux transitions, so rendering their separate indenity difficult or impossible to distinguish.

While an adequate readback amplitude is important to the correct data decoding operation of the disc file, since random, interfering noise, present in every recovered signal and in every amplifier can, if it exceeds certain thresholds relative to the desired signals, render the recovered signal so indistinguishable from the noise that reliable interpretation of the recorded data is rendered impossible. The trend towards higher data densities, necessitating increasingly closer spacing of adjacent flux transitions on the disc, has caused clear resolution of the flux transitions to become even more important than high amplitude.

The resolution of adjacent flux transitions, recorded on the disc, is firstly, a function of the construction of the head, secondly, a decreasing functionof the thickness of the magnetic coating on the disc surface, and thirdly, a decreasing function of the distance between the head and the magnetic coating.

Various factors degrade resolution. As the head is removed further away from the disc surface, the well defined boundaries between adjacent areas of opposite magnetisation, on the disc surface, become less easy for the head to distinguish from one another. As the thickness of the magnetic coating of the disc increases, the sharpness of the boundaries between adjacent areas of opposite magnetisation, on the disc surface, is reduced.

It will be seen that the closer the head lies to the surface of the disc, and the thinner the magnetic coating on the disc, the better the resolution of the head and disc combination becomes.

The relatively slow angular speeds of rotation of the disc on most flexible disc files, compared to the speed of rigid discs, has resulted in "in contact" head operation, where the head rubs at least for a proportion of the time, against the magnetic coating of the disc. The improved resolution obtained by the reduction of the distance between the disc surface and the head to zero, was of great utility in the design of the earlier disc files employing flexible media.

The vary high data densities, now required of flexible disc drivers, has necessitated the institution of even more rigorous control of all parameters relating to amplitude and resolution.

A disc life expectancy problem exists when the "in contact" method of head to disc operation is employed. The head rubbing against the surface of the disc, wears away the disc coating, resulting in the generation of debris. While it is arranged that most of the debris is collected in an absorbent lining, inside a protective jacket, which surrounds the flexible disc, a significant amount of the debris finds its way either to adhere beneath the head, or to adhere to other locations on the disc surface. Debris, adhering to the head, lifts the head away from the disc surface, degrading both amplitude and resolution. The spots from which the debris have been worn, become thin, the thinness of the magnetic coating in these places, though possessing excellent resolution, causing a reduction, often drastic, in the amplitude of the recovered signals. Drastic reductions in replay amplitude, localised around the data track, are known as dropouts, and cause data recovery errors in the disc file, either because of the noise sensitivity of weaker signals, or because of the inability of the disc file to handle rapid changes in signal size. Debris, adhering to other spots on the disc surface, cause a local increase in the thickness of the magnetic coating which posess high amplitude but poor resolution.

Disc wear has come to be a major problem in the field of operational reliability of flexible disc files. Much work has been done on the design of disc coatings and head shapes to minimise the rate of attrition of the disc coating. The results of these endeavours have produced the position where, at present, a state-of-the-art design of head, sitting on a track, on a state-of-the-art design of disc, will destroy that track in around one million revolutions of the disc. The head will most likely require to be cleaned thereafter to remove adhereing debris. Any one data storage track, on a disc, being destroyed, is usually enough for that disc to be considered totally destroyed, i.e. of no further operational use.

Measurements show that the rate of wear of a head, located premanently over one track, on the disc, is not a linear function of time. The destruction of the magnetic layer on the disc is negligible right up to a short period before the end of life is encountered. During this short period, nearly all of the damage is done. If the damage, done to a track could be restricted to a level below that at which catastrophic breakup of the disc magnetic coating occurs, the lifetime of a disc could be significantly extended.

Up to the present, other than in the fields of head and disc design, there has been little alternative effort directed towards extending the operational life expectancy of discs.

In the operation of a disc file, after the head has been located over a particular, data storage track for a data transfer operation, it is the custom to leave the head over that track until such time that it is required to be located over another track. Commonly used tracks thus receive much more wear than little used track. The amount of wear accruing to the commonly used tracks is out of all proportion to their actual use for data transfer. The last track accessed in commonly used routines, will be destroyed long before the others.

It is therefore desirable to ensure that no one track, on the disc, is more at risk from destruction by the head, than any other track. It is also desirable that the amount of wear, encountered by any track, is kept, for as long as possible, below the limit where catastrophic destruction of the local disc magnetic coating occurs.

OBJECTS OF THE INVENTION

Accordingly, it is a prime objective, of the present invention, to provide a method and apparatus whereby the above objectives may be achieved.

It is particularly objective of the present invention to provide a method and apparatus, for use in conjunction with data storage disc file, whereby the attrition of the media surface, by the transducer of the disc file, is distributed accross the entire, data storage area of the rotating media.

It is another particular, objective of the present invention to provide a method and apparatus, for use in conjunction with a data storage disc file whereby the attrition of the media surface, by the transducer of the disc file, is uniformly distributed accross the entire, data storage area of the rotating media.

It is a more particular objective of the present invention to provide an apparatus, for use in conjunction with a data storage disc file, whereby the transducer of the disc file is kept in a constant state of radial transport accross the rotating media, whenever the disc file is not in the course of performing any operation requiring that the transducer be located at any specific radius on the media.

It is a most particular objective of the present invention to provide an apparatus, for use in conjunction with a data storage disc file, whereby the transducer of the disc file is kept in a constant state of radial transport accross the rotating media whenever the disc file is not in the course of performing any operation requiring that the transducer be located at any specific radius on the rotating media, the transport being such that, the transducer spends, on average, the same amount of time adjacently disposed to any one particular radius, on the media, as it does being adjacently disposed to any other.

It is another, most particular objective of the present invention to provide an apparatus, for use in conjunction with a data storage disc file, whereby the transducer, of the disc file, is kept in a constant state of radial transport accross the media whenever the disc file is not in the course of preforming any operation which requires that the transducer be located at some specific radius, on the media, the transport being such that, the transducer spends, on average, an amount of time, adjacently disposed to each radius, on the media, which is in inverse proportion to the rate of wear at each radius on the rotating media.

BRIEF DESCRIPTION OF THE INVENTION

In a first preferred embodiment of the present invention, a magnetic disc file, employing a rotating magnetic disc for the storage of retrievable, informational data thereon, the data being stored, on the disc, in a plurality of concentric, data storage tracks, wherein a radially mobile, magnetic head is located, at known radii on the disc surface, so as to be adjacently disposed to the particular data storage track or tracks, on the disc, marking the location of the data it is desired to store or retrieve, is provided with an apparatus, comprising two parts, for the distrubution, among the data storage tracks, of head to disc wear, where the first part of the apparatus monitors the operational condition of the disc file, providing an output indicative of whether or not the disc file requires that the head be adjacently disposed to any particular data storage track, and where the second part of the apparatus, receiving, as an input, the output of the first part of the apparatus, responds to that output being indicative of the disc file being indifferent to the radial location of the head, on the disc, firstly, by causing the head to be adjacently disposed to the data storage track of greatest radius, for a fixed interval of time, secondly, by causing the head to proceed, sequentially, from track to track, accross the surface of the disc, towards the centre of the disc, the head spending the same, said fixed interval of time adjacently disposed to each track on the disc, thirdly, by returning the head to be adjacently disposed to the track of greatest radius immediately after it has been disposed adjacently to the track of least radius, and lastly, by repeating the entire action, as described, without cessation, until such time as the output of the first part of the apparatus indicates that the disc file is no longer indifferent to the radial location of the head on the disc.

In a second preferred embodiment of the present invention, a magnetic disc file, employing a rotating magnetic disc for the storage of retrievable, informational data thereon, the data being stored, on the disc, in a plurality of concentric, data storage ttacks, wherein a radially mobile, magnetic head is located, at known radii on the disc surface, so as to be adjacently disposed to the particular data storage track or tracks, on the disc, marking the location of the data it is desired to store or retrieve, is provided with an apparatus, comprising two parts, for the distribution, among the data storage tracks, of head to disc wear, where the first part of the apparatus monitors the operational condition of the disc file, providing an output indicative of whether or not the disc file requires that the head be adjacently disposed to any particular data storage track, and where the second part of the apparatus, receiving, as an input, the output of the first part of the apparatus, responds to that output being indicative of the disc file being indifferent to the radial location of the head, on the disc, firstly, by causing the head to be adjacently disposed to the data storage track of greatest radius, secondly, by causing the head to proceed, sequentially, from track to track, accross the surface of the disc, towards the centre of the disc, the head spending an interval of time adjacently disposed to each track which is in inverse proportion to the known rate of head to disc wear on each track, on the disc, thirdly, by returning the head to be adjacently disposed to the track of greatest radius immediately after it has been disposed adjacently to the track of least radius, and lastly, by repeating the entire action, as described, without cessation, until such time as the output of the first part of the apparatus indicates that the disc file is no longer indifferent to the radial location of the head on the disc.

The operation of the present inventions, together with further aims and objectives thereof, will be better understood by consideration of the following description, in conjunction with the appended drawings.

BRIEF DESCRIPTION OF THE DRAWINGS

FIG. one shows, in schematic form, the system of the first preferred embodiment.

Figure 1:
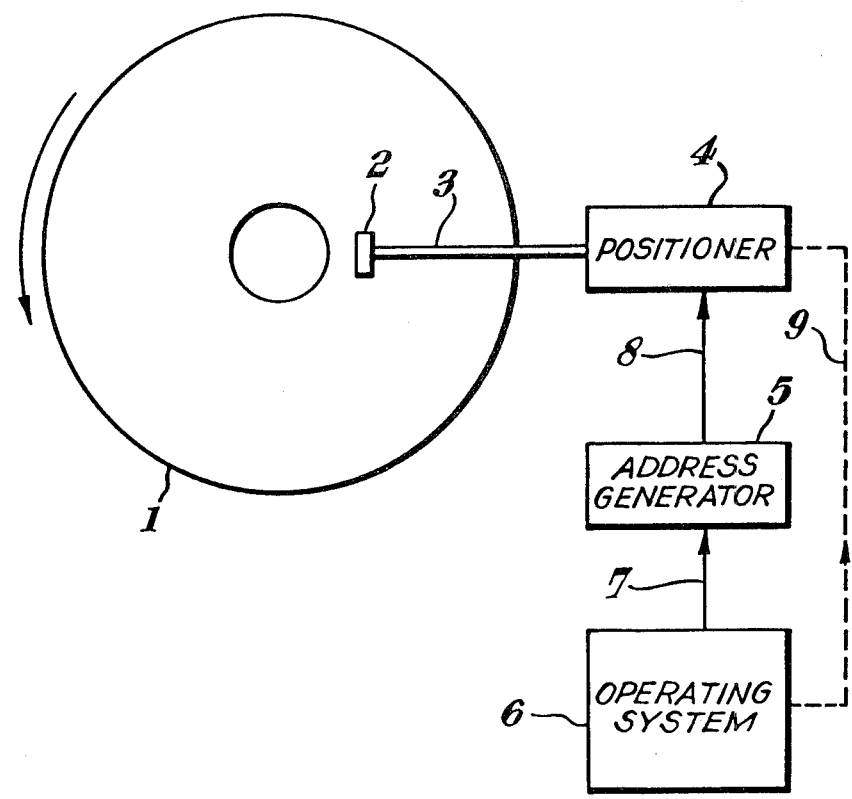

FIG. three shows, by way of example, the manner in which a complementary time versus radius profile is achieved in the second preferred embodiment.

FIG. four shows, in schematic form, the component parts of the controller of the first preferred embodiment.

FIG. five shows, by way of a flow chart, the head sweeping action of the first preferred embodiment.

FIG. six shows, in schematic form, the system of the second preferred embodiment.

FIG. seven shows, in schematic form, the component parts of the controller of the second preferred embodiment.

FIG. eight shows, by way of a flow chart, the head sweeping action of the second preferred embodiment.

DESCRIPTION OF THE FIRST PREFERRED EMBODIMENT

Attention is first drawn to FIG. one, showing the system of the first preferred embodiment of the present invention.

A rotating, magnetic disc (1) has, disposed adjacently to its surface, a radially mobile magnetic head (2). The head (2) is mechanically coupled to the head positioner (4) by the head mechanical coupling (3). The head positioner (4) is responsive to inputs from the disc file operating system (6), and also from an address generator (5). The address generator (5) is itself responsive to other outputs from the disc file operating system (6).

The head positioner (4), receiving at either of its inputs, a binary number, responds to that number by causing the head (2) to be adjacently disposed to the data storage track on the disc (1), corresponding to that number. The tracks are numbered such that the track of greatest radius bears the number zero, the other tracks being numbered, sequentially by unit increment, towards the centre of the disc, so that the track of least radius bears the highest number, that number being on less than the total number of tracks per surface of the disc (1).

The disc file operating system, (6), during normal data transfer operation of the disc file, provides binary numbers to the head positioner (4), indicative of the data storage track with which the head (2) should interact, the binary numbers being made available via the positioner coupling (9). At those times that it is not required by the disc file operating system (6) that the head be at any particular track, no output is provided to the positioner coupler (9).

There are provided, within the disc file operation system (6), various registers whose contents are indicative of the state of operation of the disc file. The outputs of these registers are coupled to the address generator (5) via the state coupling (7)

The address generator (5) also provides binary numbers, indicative of data storage tracks, to the head positioner (4), via the sweep coupling (8) at those times that the disc file operating system is indifferent to the position of the head (2).

Attention is next drawn to FIG. four, showing the component parts of the address generator. (5).

The outputs of the registers in the disc file operating system (6) are coupled to state decoding logic (19). The state decoding logic (19) provides a first output to the gate logic (17) and a second output to the resetting OR gate (20). The output of the resetting OR gate (20) is coupled to the resetting input of the track counter (18). The track counter (18), an incremental counter, is provided with clock pulses from the clock generator (24).

The output of the track counter (18) is coupled, firstly, as the through controlled input of the gate logic (17), and secondly, as the first input of a numerical comparator (22). The second input to the numerical comparator (22), being a number equal to the number of the track of least radius, is provided by a number generator (21). The output of the numerical comparator (22) is coupled as a second input, to the resetting OR gate (20).

The output of the gate logic (17), being the through gated output of the track counter (18), is coupled, as a track indicating binary number, into the head positioner (4).

Whenever the disc file operating system (6) becomes indifferent to the position, on the disc (1), of the head (2), the state decoding logic (19) detects, by examination of the registers in the disc file operating system (6) for a key state or states, the indifference condition, and resets the track counter (18) so that its contents are zero.

At the same time, the state decoding logic (19) opens the gate logic (17) so that the contents of the track counter (18) are applied as a track indicating binary number to the input of the head positioner (4). The head is placed, through the response of the head positioner (4) to the binary number, over track zero, the track with the greatest radius. After a time interval, the counter (18) is incremented by the application of a clock pulse from the clock generator (24), a source of regularly repetitive pulses with period equal to the time that the head (2) spends over each track. The head (2) is thus moved to track one, two, and so on until the number in the track counter exceeds the number from the number generator (21). The numerical comparator (22) then provides an output, indicative of its first input being provided with a binary number greater than the binary provided at its second input, which output resets the contents of the track counter (18) to zero.

The operation of the address generator (5) is thus to provide, at regular intervals, to a responsive head positioner (4), a track indicating incremental number, which number starts at zero increments so that the head (2) moves accross the surface of the disc (1), and resets to zero whenever the number exceeds a predetermined limit, equal to the number of the track of least radius. The address generator (5) is operational only at those times that the disc file operating system (6) has no need to position the head (2). The head positioner (4), responsive to these numbers, caused the head (2) to step, with a regular period, from the outside data track to the innermost data track, staying the same amount of time on each track, and returning the head (2) to the outside track to start again.

Figure 2A:
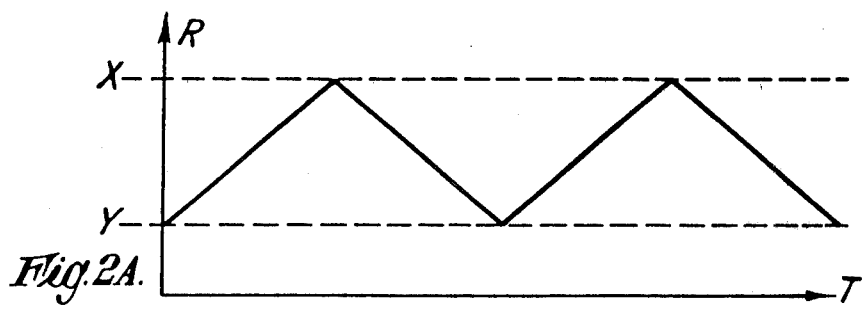
FIGS. 2A-2D show various, equally valid, radius versus time profiles, operational within the spirit of the first preferred embodiment.
Figure 2B:
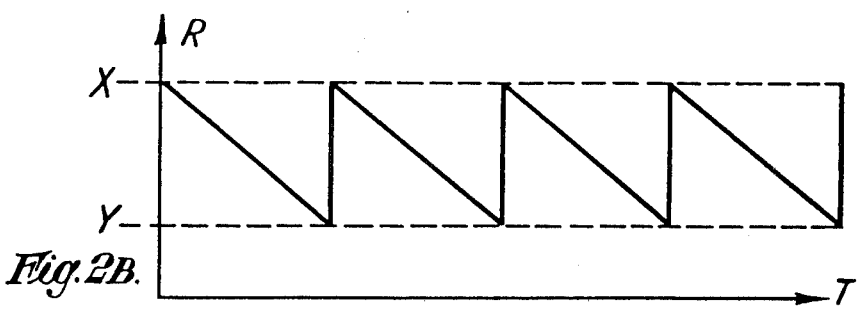

Attention is next drawn to FIG. 2B, showing the position versus time profile of this embodiment. The horizontal axis marked "T" denotes time, and the vertical axis, marked "B" denotes the radius of the head (2) on the disc (1). The vertical ordinate marked "X" denotes the radius of the outside data track, track zero, and the vertical ordinate marked "Y" denotes the radius of the innermost data track.

Attention is also drawn to FIG. five, showing, by way of a flow chart, the counting activity of the address generator (5).

It will be apparent to those, skilled in the art, that a number of different time versus radius profiles equally well fulfil the spirit of the first preferred embodiment in that they distribute the time the head is over any track equally between all tracks.

Figure 2C:
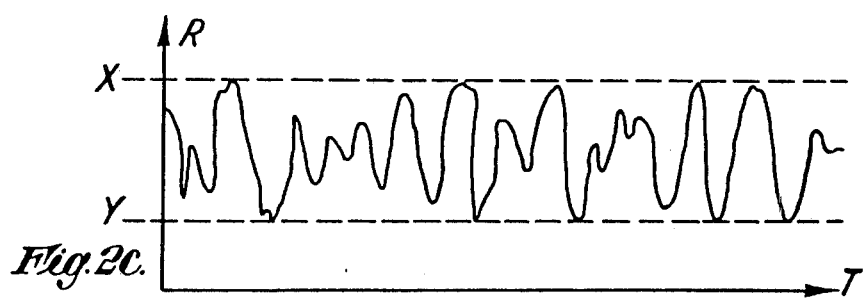
Figure 2D:
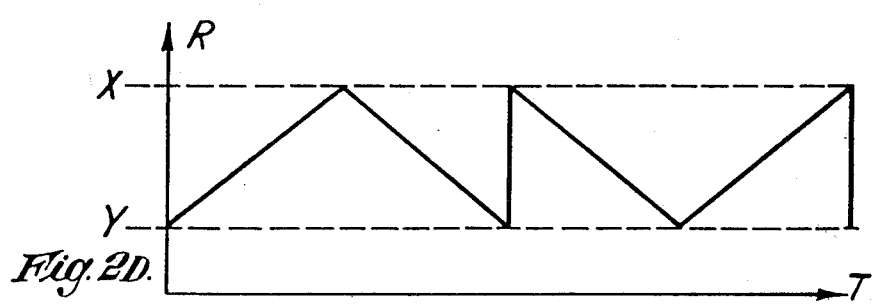
Figure 3:
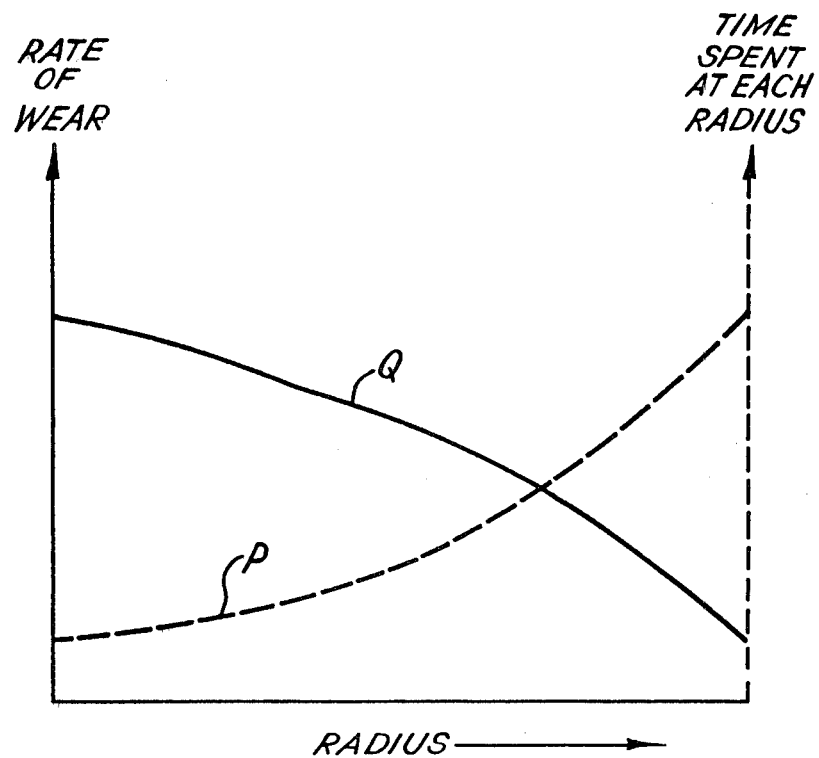
Figure 4:
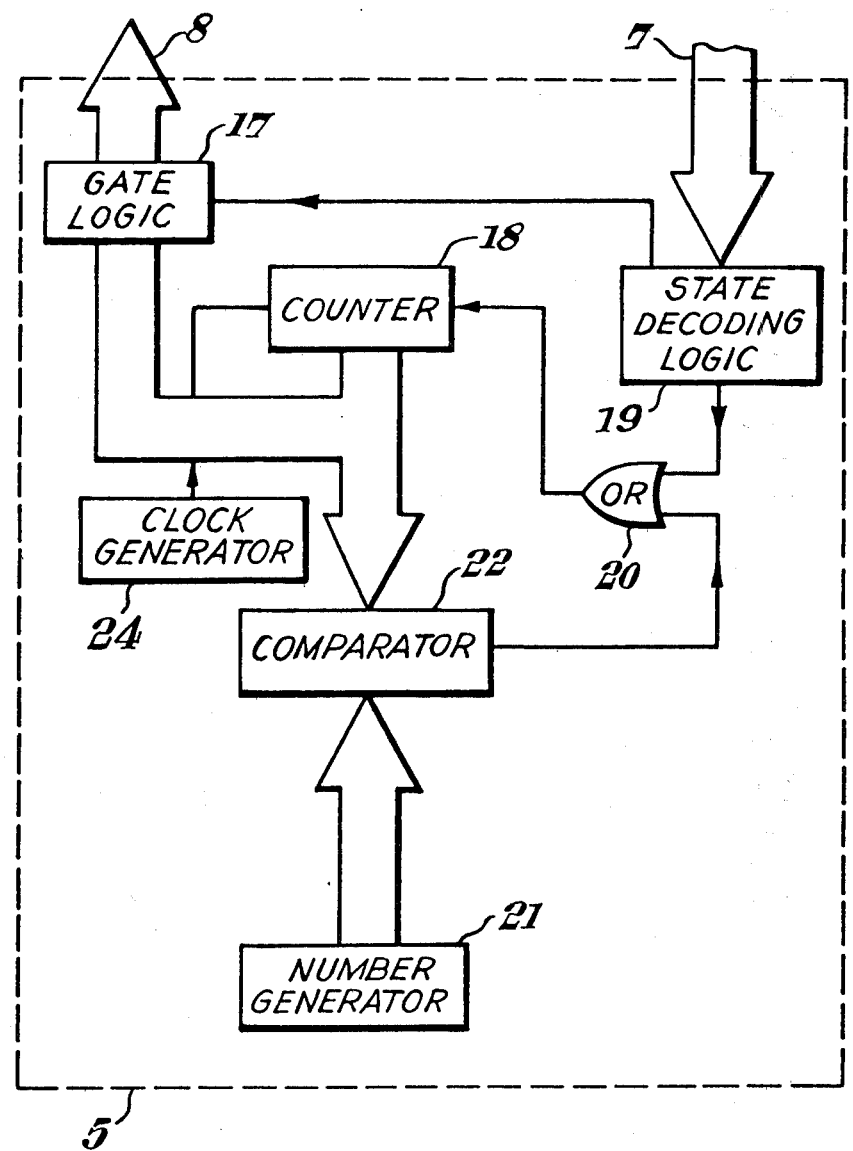
Figure 5:
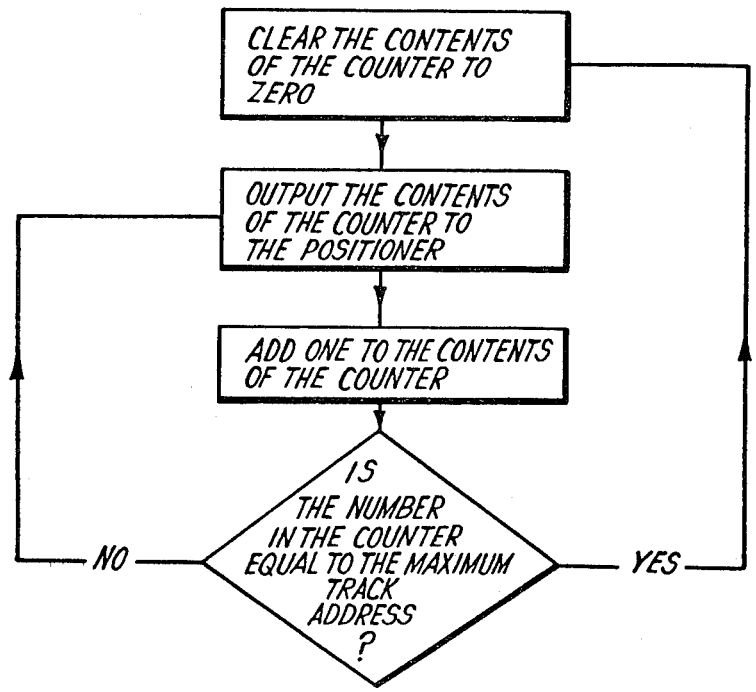
Figure 6:
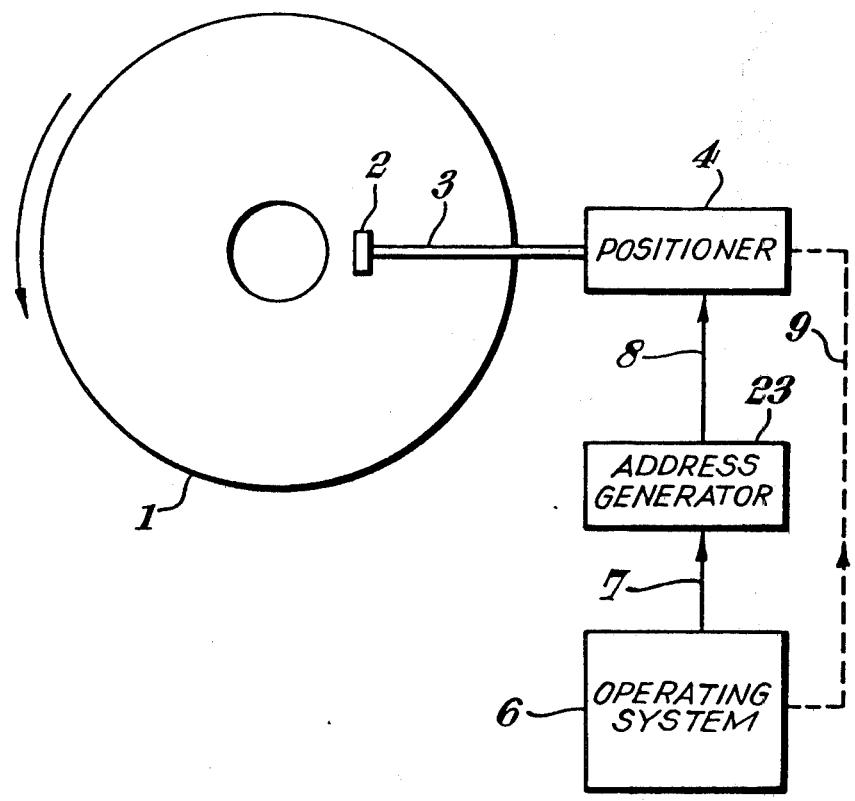
Figure 7:
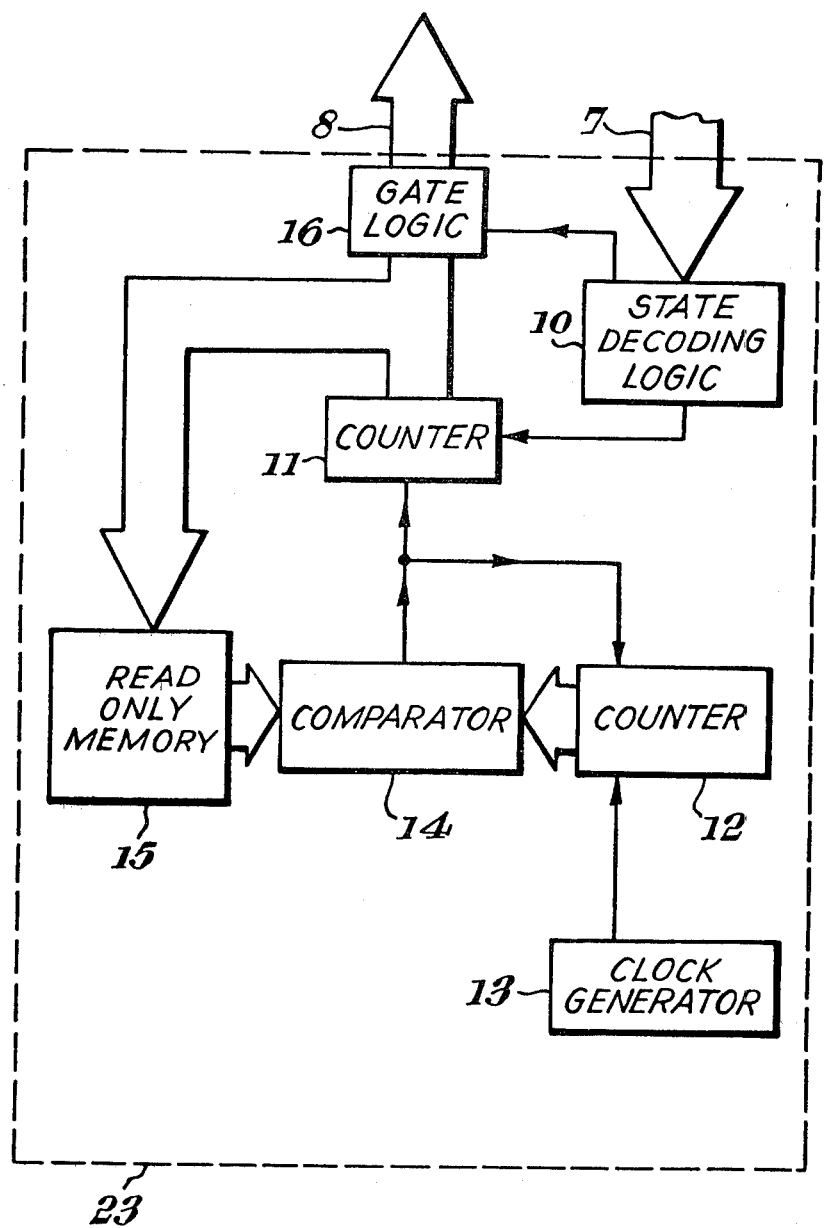
Figure 8:
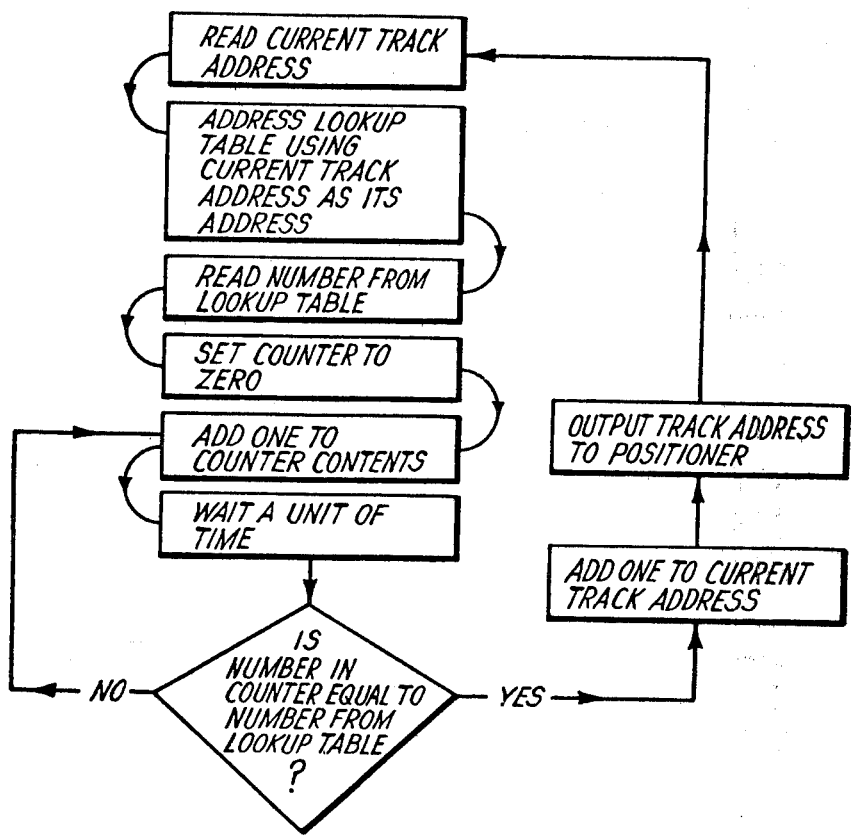

By way of example, FIG. 2A shows a triangular wave, FIG. 2C shows a random relationship, bounded by the maximum and minimum radii, and FIG. 2D shows how any two or more independently acceptable waveforms may be concatinated together to form another acceptable waveform.

It will also be apparant to those skilled in the art that the wear distribution activity may be restricted to fewer or more tracks than the total number of data tracks.

It will also be apparant to those skilled in the art that many other track numbering and counting schemes will function equally as well as the first preferred embodiment.

It will also be apparant to those skilled in the art that by keeping the head (2) cycling accross the disc (1), instead of unloading the head (1) completely from the disc (1), the risk of damage to the head (2) by repeated loading and unloading is avoided, and the access time to any subsequent data track is, on average, unaffected.

It will also be apparant to those skilled in the art that conditions may be provided where the head (2) is restrained from cycling accross the disc (1) surface, by some state, in the disc file operating system (6), where it would not be desirable for the head (2) to do so.

DESCRIPTION OF THE SECOND PREFERRED EMBODIMENT

Attention is next drawn to FIG. six, showing in schematic form, the system of the second preferred embodiment of the present invention. The schematic layout of the system is identical to the schematic layout of the first preferred embodiment, and all of the component parts are the same, except for the replacement of the address generator (5) by a controller (23). The controller (23) like the address generator (5) generates addresses for application to the head positioner (4), but unlike the address generator (4), also varies the time the head (2) spends adjacently disposed to each track.

A rotating, magnetic disc (1) has, disposed adjacently to its surface, a radially mobile magnetic head (2). The head (2) is mechanically coupled to the head positioner (4) by the head mechanical coupling (3). The head positioner (4) is responsive to inputs from the disc file operating system (6) and also from a controller (23). The controller (23) is itself responsive to other outputs from the disc file operating system (6).

The head positioner (4), receiving at either of its inputs, a binary number, responds to that number by causing the head (2) to be adjacently disposed to the data storage track, on the disc (1), corresponding to that number. The tracks are numbered such that the track of greatest radius bears the number zero, the other tracks being numbered, sequentially, by unit increment, towards the centre of the disc, so that the track of least radius bears the highest number, that number being one less than the total number of tracks per surface of the disc (1).

The disc file operating system (6), during normal data transfer operation of the disc file, provides binary numbers to the head positioner (4), indicative of the data storage track with which the head (2) should interact, the binary numbers being made available to the head positioner (4) via the positioner coupling (9). At those times that it is not required by the disc file operating system (6), that the head (2) be at any particular track, no output is provided to the positioner coupler (9).

There are provided, within the disc file operating system (6), various registers whose contents are indicative of the state of operation of the disc file. The outputs of these registers are coupled to the controller (23) via the state coupling (7).

The controller (23) also provides binary numbers, indicative of data storage tracks, to the head positioner (4), via the sweep coupling (8), at those times that the disc file operating system is indifferent to the position of the head (2).

Attention is next drawn to figure seven, showing in schematic form the component parts of the controller (23).

The outputs of the registers in the disc file operating system (6) are coupled to state decoding logic (10). The state decoding logic (10) provides a first output to the gate logic (16) and a second output which resets, to zero, the contents of the track counter (11).

The output of the track counter (11) is coupled, firstly, as the through controlled input of the gate logic (16), and secondly, as the addressing input to a read only memory or ROM (15).

The output of the gate logic (16) being the through gated output of the track counter (11), is coupled, as a track indicating binary number, into the head positioner (4).

The contents of the ROM (15) are provided as the first input to a numerical comparator (14). A time counter (12), incremented by a regularly repetitious clock (13), provides the second input to the numerical comparator (14). Whenever the second input exceeds the first input of the numerical comparator (14), the numerical comparator (14) provides an output which simultaneously resets the time counter (12) and applies a clock pulse to the track counter (11). The track counter (11) is an incremental counter, and, whenever it receives a clock pulse, its contents are increased by one.

Whenever the disc file operating system (6) becomes indifferent to the position, on the disc (1), of the head (2), the state decoding logic (10), detects, by examination of the registers in the disc file operating system (6) for a key state or states, the indifference condition and resets the track counter (11) so that its contents are zero. At the same time, the state decoding logic (10) opens the gate logic (16) so that the contents of the track counter (18) are applied as a track indicating binary number to the input of the head positioner (4). The head (2) is placed, through the response of the head positioner (4) to the binary number, over track zero, the track with the greatest radius.

The output of the track counter (11) coupled as the addressing input to the ROM (15), causes a number to appear at the output of the ROM (15) which is indicative of the relative amount of time that the head (2) should remain over each track.

The output of the ROM, coupled as the first input of the numerical comparator (14), is compared by the numerical comparator (14), with the contents of the time counter (12). As soon as the contents of the time counter (12), regularly incremented by the clock (13), equal the output of the ROM (15), the numerical comparator (14) resets the contents of the time counter (12) to zero and simultaneously increments the contents of the track counter (11) by one. The track address, fed to the head positioner (4), thus remains static for an amount of time equal to the number of pulses from the clock (13) required to equal the number stored in the ROM for each track.

The track counter (11) resets its own contents to zero whenever they exceed the number of the track of least radius on the disc (1).

The operation of the controller (23) is thus to provide, for intervals which are appropriate to each track, as the input to a responsive head positioner (4), a track indicating incremental number, which number starts at zero, increments so that the head (2) moves across the surface of the disc (1), and resets to zero whenever the number exceeds a predetermined limit, equal to the number of the track of least radius. The controller (23) is operational only at those times that the disc file operating system (6) has no need to position the head (2). The head positioner (4), responsive to these numbers, causes the head (2) to step, with a dwell time at each track which is a predetermined function of the radius of the head (2) on the disc (1) at each track, from the outermost data track on the disc (1) to the innermost data track on the disc (1) returning the head (2) on completion to the outside track to start over again.

Attention is next drawn to figure three, showing how the contents of the ROM (15) are arrived at.

A number of discs are run to destruction with a head adjacently disposed at various fixed radii on the discs. The number of revolutions of each disc required for its destruction are noted. The average number of revolutions, at each radius, required for destruction of the discs, is calculated. The inverse of these average numbers is found. The inverses are taken as a measure of the rate of wear at each radius.

The points so found are plotted on a graph, and joined by a smooth curve to give by interpolation, rates of wear at radii other than those at which the measurements were taken. The curve marked Q on figure three is thus obtained.

A second curve is next calculated, being a scaled inverse of the curve Q. This is the curve P of figure three. At each radius, the Q value, multiplied by the P value, is constant. It does not matter particularly what that constant is.

It will be readily appreciated that the P value requires no computation, since the P value, being the inverse of the rate of wear, which is itself the inverse of the average number of revolutions required to destroy a disc at the test radii, is thus the number of revolutions required to destroy the discs at each radius. The P value may thus be obtained by plotting the average number of revolutions for destruction against radius.

The P value is then taken as a multiplying constant in order to provide numbers to be stored in the ROM (15). It is arranged that the highest value of P encountered among the data storage tracks is made equivalent to the highest number that the ROM can store. All other numbers stored in the ROM (15), are scaled accordingly.

The ROM (15) contents table is thus constructed by storing, in the ROM (15), the appropriately scaled P value corresponding to the radius of each data storage track on the disc (1).

Attention is finally drawn to figure eight, showing, by way of a flow chart, the counting and timing activity of the controller (23).

It is to be appreciated that the time rate of repetition of the clock (13) must be sufficiently slow for the head to have time to move from track to track, and may be varied, according to this limit, to achieve faster or slower rates of head movement.

It will be apparent to those, skilled in the art, that a number of different methods of changing the track counter's contents, by means of various permutations, other than that shown are equally acceptable.

It will also be apparent, to those skilled in the art, that the wear distribution activity may be restricted to fewer or more tracks than the total number of data tracks on the disc (1). What I claim is:

1. A disc data store using a flexible rotary storage medium including, a transducer in contact with the storage medium, a positioner for responding to single address command signals to position said transducer, and an operating system operating in a first state to select a data track and provide address command signals to enable the transducer to be positioned over the selected track to read or write, the disc data store further having apparatus for operating in a second state to move said transducer continuously across said flexible rotary storage medium to reduce wear comprising:

state decoding logic in said operating system for examining the state of operation of said disc data store and for providing an indication than said disc data store is in said second state;

an address generator responding to the second state of said state decoding logic to generate a succession of address commands and provide said address commands to said positioner to move said transducer in a track-to-track movement across the rotary storage medium repeatedly to allow attritional wear between said flexible rotary storage medium and said transducer to be distributed across said flexible rotary storage medium.

2. The apparatus of claim 1 in which during said second state of said disc data store said transducer stops for a predetermined period of time at each track to evenly distribute wear on flexible rotary storage medium.

3. The apparatus of claim 1 comprising gate control logic receiving said address commands from said address generator and the output of said state decoding logic, said gate control logic responding to an indication of said second state by said state deconding logic to couple said address commands from said address generator to said positioner.

4. An apparatus according to claim 3 wherein said address generator comprises a clock signal generator for providing a succession of timing pulses and further comprises a counter coupled to receive said succession of pulses, operable to respond thereto to move through a cyclic succession of counts, and coupled to provide said succession of counts as said sequence of address command signals.

5. An apparatus according to claim 4 wherein said succession of counts is provided as said sequence of address command signals to position said transducer such that, on average, said transducer is not positioned at any one radius on said medium on a greater number of occasions than it is positioned on any other radius on said medium.

6. An apparatus according to claim 5 wherein said succession of counts is operative to move said transducer through a repeated cyclic movement wherein one cycle of said movement consists in the movement of said transducer from track to track across said medium at a steady rate to perform a sweep from the outermost track on said medium to the innermost track on said medium, and thereafter the rapid return of said transducer from said innermost track to said outermost track.

7. An apparatus according to claim 4 wherein said address generator is operable to control the amount of time the transducer spends on each radius on said medium such that the average amount of time that said transducer spends at each radius is a predetermined function of that radius.

8. An apparatus according to claim 7 wherein said predetermined function is such that said transducer spends, on average, an amount of time at each radius on said medium which is inversely proportional to the rate of attrition of said medium by said transducer at that radius.

9. An apparatus according to claim 7 wherein compliance with said predetermined function is achieved by said address generator being operable to control the radial velocity of said transducer on said medium dependently upon the instant radius of said transducer on said medium.

10. An apparatus according to claim 7 wherein said address generator comprises a clock signal generator for providing a succession of timing pulses and further comprises a counter coupled to receive said succession of pulses, operable to respond thereto to move through a cyclic succession of counts, and coupled to provide indication of said succession of counts as said sequence of address command signals.

11. An apparatus according to claim 10 wherein compliance with said predetermined function is achieved by a combination of said clock signal generator being operable to control the amount of time that said counter spends on one count before proceeding to the next and of said succession of counts being such that said transducer is positioned at some radii on said medium on a greater number of occasions than it is positioned at other radii on said medium.

12. An apparatus according to claim 7 wherein said clock generator comprises a read-only memory, coupled to receive said succession of counts from said counter as an address input and operable to provide in response to each of said counts an output indicative of the number of said timing pulses to be received before next change of said count.

13. An apparatus according to claim 12 wherein said clock generator further comprises a timing pulse accumulator and a numerical comparator, said numerical comparator comparing said output of said read-only memory and the number of said timing pulses and resetting said accumulator and changing said count whenever the contents of said accumulator equal said output of said read-only memory.

14. An apparatus according to claim 7 wherein said clock signal generator maintains a fixed, predetermined interval between successive pulses in said succession of pulses and wherein said succession of counts is such that compliance with said predetermined function is achieved by the number of times that said transduces is positioned at each radius on said medium.

15. An apparatus according to claim 7 wherein said succession of counts is such that said transducer is not positioned at any one radius on said medium a greater number of times than it is positioned at any other radius on said medium, and wherein compliance with said predetermined function is achieved by said clock signal generator being operable to control the length of time that said counter will stay at any one count before proceeding to the next count.

16. An apparatus according to claim 7 wherein said transducer is located at each radius on said medium, on average, for the same amount of time.

17. A disc data store using a flexible rotary storage medium including a transducer (2) for use in contact with the flexible rotary medium (1) wherein a positioner (4) is operable to respond to an address command to position said transducer (2) adjacently to the data storage track determined by said address command signal out of a plurality of data storage tracks on said medium (1), said disc data store comprising: state decoding logic (10, 19) for examining the state of operation of said disc data store and for providing indication whenever said disc data store is not in the course of performing any operation requiring said transducer (2) to be in any particular one out of said plurality of tracks, an address generator (18, 11) operable to generate a succession of said address commands, and gate logic (16, 17) in receipt of said succession of address commands, and in receipt of said indication from said state decoding logic (10, 19), and operable in response to said state decoding logic (10, 19) providing said indication to couple said succession of address commands as input to said positioner (4) in place of any address commands from the disc data store operating system (6), said succession of address commands being operative to maintain said transducer (2) in continual and repeated movement back and forth across said medium from track to track.

18. A disc data store according to claim 17 wherein during the period of non-required operation and responsive to an address generator (5, 11, 18) the positioner (4) causes the transducer (2) to step within a certain time from one track to another across the disc medium (1) and then the transducer (2) is returned to said one track to start the traverse movement again.

19. A data disc store according to claim 18 wherein the amount of time elapsed for a step from one track to another is changeable with each step.

20. A data disc according to claim 19 wherein the amount of time the transducer spends at each radius on said disc medium increases with an increase in radius.

21. A data disc according to claim 17 wherein there is a scaled value stored in memory (15) corresponding to the radius of each data storage track of the disc medium (1), and wherein a controller (23) is operational only at those times that there is no need to position the transducer (2) on a particular track providing an input to the head positioner (4) of successive track indicating incremental numbers and a scaled value stored in memory.

22. A data disc according to claim 17 wherein the amount of time the transducer (2) is positioned at each track is inversely proportional to a previously measured rate of wear of the medium at that particular radius of the track, and wherein the time to be spent at each particular radius is stored in a memory with a number value against which a clocked dwell time of the transducer (2) is compared.

* * * * *